(12) United States Patent
Jiang

(10) Patent No.: US 9,938,007 B2
(45) Date of Patent: Apr. 10, 2018

(54) FLAPPING WING WITH MULTI FILM SHEETS LISTED ON NET FRAME

(71) Applicant: Wangqiang Jiang, Xi'an (CN)

(72) Inventor: Wangqiang Jiang, Xi'an (CN)

( * ) Notice: Subject to any disclaimer, the term of this patent is extended or adjusted under 35 U.S.C. 154(b) by 152 days.

(21) Appl. No.: 15/036,813

(22) PCT Filed: Aug. 6, 2015

(86) PCT No.: PCT/CN2015/086301
§ 371 (c)(1),
(2) Date: May 16, 2016

(87) PCT Pub. No.: WO2017/008359
PCT Pub. Date: Jan. 19, 2017

(65) Prior Publication Data
US 2017/0166307 A1    Jun. 15, 2017

(30) Foreign Application Priority Data

Jul. 10, 2015 (CN) .......................... 2015 1 0404989

(51) Int. Cl.
*B64C 33/00* (2006.01)
*B64C 33/02* (2006.01)
*B63H 1/32* (2006.01)

(52) U.S. Cl.
CPC ............... *B64C 33/02* (2013.01); *B63H 1/32* (2013.01)

(58) Field of Classification Search
CPC . B64C 33/02; B64C 2201/025; B64C 39/028; B64C 2201/146; B64C 33/025; B64C 2201/042; B64C 33/00; B63H 1/32; B63H 1/36; B63H 16/20
See application file for complete search history.

(56) References Cited

U.S. PATENT DOCUMENTS 4,863,413 A * 9/1989 Schwarz ............... A63H 27/007
446/34
5,899,408 A * 5/1999 Bowers, Jr. ............ B64C 33/02
244/11
(Continued)

FOREIGN PATENT DOCUMENTS

AU   1568901 A   3/2001
CN   1033032 A   5/1989
(Continued)

OTHER PUBLICATIONS

Hui Hu et al. "An Experimental Study of Flexible Membrane Wings in Flapping Flight", 208.*

*Primary Examiner* — Assres H Woldemaryam
(74) *Attorney, Agent, or Firm* — Gokalp Bayramoglu

(57) ABSTRACT

This invention discloses a flapping wing with multi film sheets listed on a net frame, wherein a fuselage is disposed on the flapping wing, transmissions are installed on both sides of the fuselage, a frame is installed on a side of each transmission, the frame is composed of supports and a fine net structure, one side edge of each film sheet is fixed on the fine net structure, and the other side edge of the film sheet can move freely; one end of a limit thread is connected with the fine net structure, while the other end of the limit thread is connected with the movable side edge of the film sheet. All the film sheets are arranged on the same side of the fine net structure.

13 Claims, 1 Drawing Sheet

(56) References Cited

U.S. PATENT DOCUMENTS

| | | | | |
|---|---|---|---|---|
| 7,255,305 B2* | 8/2007 | Earl | ............ | B64C 33/02 |
| | | | | 244/11 |
| 7,651,051 B2* | 1/2010 | Agrawal | ............ | B64C 33/02 |
| | | | | 244/22 |
| 8,382,546 B2* | 2/2013 | Van Ruymbeke | ... | A63H 27/008 |
| | | | | 244/11 |
| D730,244 S* | 5/2015 | Earon | ............ | D12/16.1 |
| 2002/0173217 A1* | 11/2002 | Kinkade | ............ | A63H 27/008 |
| | | | | 446/35 |
| 2003/0230672 A1* | 12/2003 | Charron | ............ | B64C 33/02 |
| | | | | 244/72 |
| 2009/0179108 A1* | 7/2009 | Yang | ............ | A63H 27/008 |
| | | | | 244/72 |

FOREIGN PATENT DOCUMENTS

| | | | |
|---|---|---|---|
| CN | 1055151 | A | 10/1991 |
| CN | 2122118 | U | 11/1992 |
| CN | 1097393 | A | 1/1995 |
| CN | 1453185 | A | 11/2003 |
| CN | 1600641 | A | 3/2005 |
| GB | 2470712 | A | 12/2010 |
| JP | 2000076358 | A | 3/2006 |

\* cited by examiner

FLAPPING WING WITH MULTI FILM SHEETS LISTED ON NET FRAME

TECHNICAL FIELD

This invention belongs to the technical field of ornithopter (flapping wing machine/aircraft), especially relates to a flapping wing with multi film sheets listed on net frame.

BACKGROUND

Flapping wing is the main dynamical structure of a flapping wing machine. The flapping wing generates lift force and forward propulsion by acting on air. In principle, modern ornithopter imitates the flapping wing of birds and insects. From the perspective of bionics, the flapping wing of current flapping wing machine (ornithopter) is a film fixed on a specific frame. Generally, the structure of the frame imitates the wing structure of the birds and insects. When the flapping wing beats up and down according to the fly-behavior of birds or insects, motive power is generated by the turbulent air around the flapping wing.

Because it is based on the perspective of bionics, the designed flapping wing is composed of a one-piece film, or with a plurality of holes that can reduce the resistance when the flapping wing flaps up, consequently the most area of the flapping wing is covered by a big film. Because of the existence of the big film, the bionic flapping wing is subject to strong resistance when it flaps up and down. When the flapping wing flaps up, it is subject to air resistance which blocks the rising of the aircraft. In order to reduce the air resistance that caused by flapping up of the flapping wing, a special requirement for the frame structure is needed. Such design is complicated. Some designs further require the frame structure can change shape according to the flapping so as to reduce the air resistance when the flapping wing flaps up. Just like that birds can change the wing shape according to the flapping behavior when flapping their wings. From the perspective of bionics, the design of the flapping-wing structure is quite complicated. It is inconvenient to produce and utilize such flapping-wing structure.

SUMMARY OF THE INVENTION

The object of this invention is to provide a flapping wing with multi film sheets listed on a net frame, which aims to solve the problems of complicated structure of current flapping wing, suffering air resistance while flapping up, and inconsistent swing direction of the film sheets.

This invention is realized as follows: a flapping wing with multi film sheets listed on a net frame, wherein a fuselage is disposed on the flapping wing with multi film sheets listed on net frame, transmissions are installed on both sides of the fuselage, and a frame is installed on a side of each transmission. The one-way flapping-wing frame is composed of supports and a fine net structure. One side edge of a film sheet is fixed on the fine net structure, while the other side edge of the film sheet can move freely. One end of a limit thread is connected with the fine net structure, while the other end of the limit thread is connected with the movable side edge of the film sheet. All of the film sheets are arranged on the same side of the fine net structure.

Furthermore, the film sheets is multi movable sheets.

Furthermore, the fine net structure is interwoven or non-interwoven structure.

Furthermore, the support is made of a carbon fiber or other similar material, the fine net structure is woven by a lightweight filament, such as carbon fiber or nylon thread.

Furthermore, the film sheets are arranged along with a radial direction or a transverse direction.

Another object of this invention is to apply the one-way flapping wing with multi film sheets listed on a net frame in aqueous medium fluid.

Another object of this invention is to apply the one-way flapping wing with multi film sheets listed on net frame in dual flapping wings.

Compared with the existing technology, there are some advantages provided by the flapping wing with multi film sheets listed on a net frame:

1. Giving up imitating the complicated wing structure of birds or insects, a simple net flapping wing frame structure is used. The main structure is to set up net filaments between simple supports, and maintain the frame structure in its basic shape when the flapping wing beats up and down.

2. Bionic flapping wing uses a big one-piece film sheet to cover the frame, as a result it suffers strong air resistance when the bionic flapping wing beats up and down. A special design for the frame structure is needed to have different air resistances when the flapping wing flutters up and down. This invention adopts a net flapping wing frame structure, which replaces the big one-piece film sheet with a plurality of movable film sheets to cover on the frame. When the flapping wing flutters up and down, the film sheets can be opened and closed automatically due to the air resistance, consequently, it is subject to different air resistance when fluttering up and down. In order to produce more air propulsion, the small film sheets are arranged in a partially overlapping manner.

3. After arranging the movable film sheets, the open and close direction of the film sheets are consistent when the flapping wing flutters up and down; the open and close direction of some film sheets maybe inconsistent with each other when the fluttering gets more intense. Therefore, finding several points on the edge of the film sheets, and connecting them with several corresponding points in the net of the frame by length-limited filaments or fine stripes to limit the movement range of the film sheets, so that the open and close direction of the film sheets can keep consistent no matter how intense the movement is.

Figure 1A:
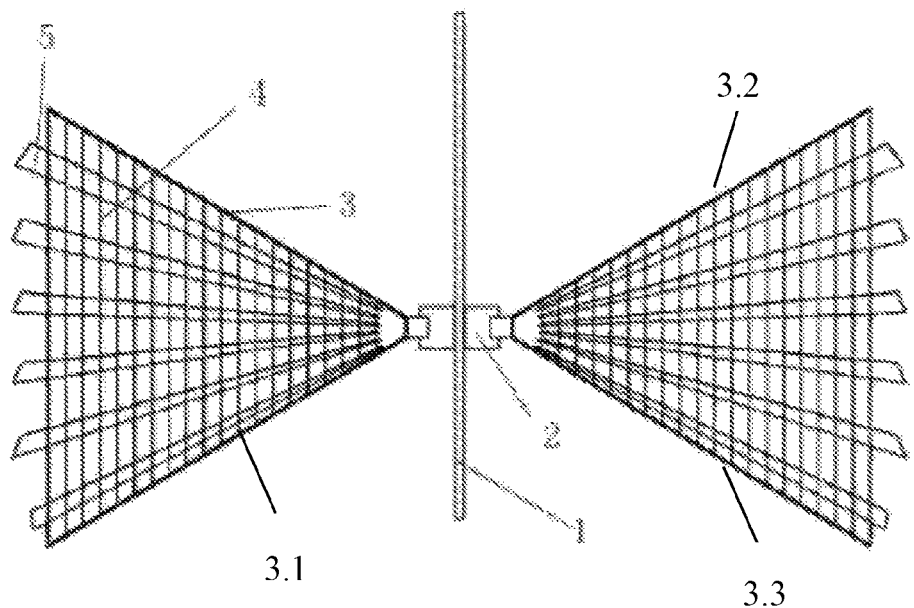
FIG. 1A is a schematic diagram of the flapping wing with multi film sheets listed on a net frame.

In the drawings: 1. fuselage; 2. transmission; 3. first support line; 3.1 second support line; 3.2 third support line; 3.3 fourth support line; 4. fine net structure; 5. film sheet; 6. limit thread.

DETAILED DESCRIPTION

In order to clarify the object, technical scheme and advantages of this invention, a further detailed description will be described as follows in conjunction with the embodiments. It should be understood that the specific embodiments described herein are solely for the interpretation of the present invention, but not limit the present invention.

The flapping wing in this invention is composed of a net frame and multi movable film sheets. After the film sheets are arranged in a certain manner, air can smoothly pass through the film sheets along a designed direction and produce strong resistance along the opposite direction. So, the flapping wing can generate lift force just by fluttering up and down.

Hereinafter the structure of the invention would be detailed described in conjunction with the accompanying drawings.

Figure 1B:
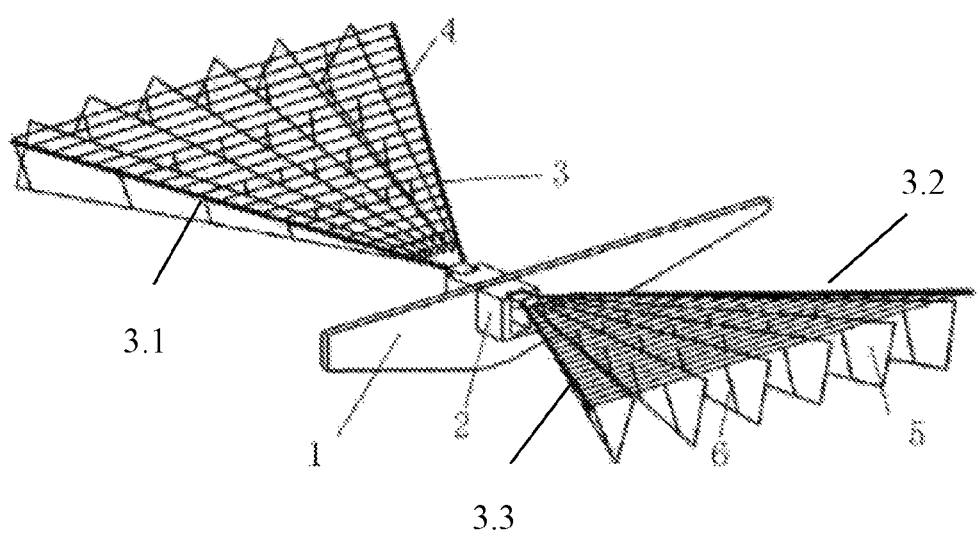
FIG. 1B is another view of the flapping wing with multi film sheets listed on a net frame.

As shown in FIG. 1A and FIG. 1B, the flapping wing with multi film sheets listed on a net frame mainly comprises: fuselage 1, transmission 2, support 3, fine net structure 4, film sheet 5, limit thread 6.

The frame structure of the flapping wing is composed of supports 3 and fine net structure 4; one side edge of film sheet 5 is fixed on fine net structure 4, while the other side can move freely. Film sheets 5 are arranged in a certain way. One end of limit thread 6 is connected with fine net structure 4, while the other end is connected with the movable edge of film sheet 5. In this way, the movement of film sheet 5 can be limited in a certain range; when net supports 3 move up and down under the driving of transmission 2, film sheets 5 will be opened or closed automatically in the effect of air. Film sheets 5 will be opened when the flapping wing flutters up, so that the air can pass through the film sheets smoothly and the flapping wing suffers a little air resistance. Film sheets 5 will be closed when the flapping wing flutters down, at this time the air cannot pass through the film sheets smoothly and the flapping wing can produce strong air resistance (i.e. propulsion). Therefore, when the flapping wing keeps fluttering up and down, lift force is generated.

The working principle of this invention:

The frame structure of the net flapping wing, which is mainly composed of fine net and supports for fixing the fine net. The fine net structure can be interwoven or non-interwoven; the supports use high strength and lightweight material, such as carbon fiber, to reduce the weight of the supports and the number of supports can be increase to make the structure more stable, the net structure is woven by high strength and lightweight filaments such as carbon fiber or nylon thread; the mesh is in a general size that not only can meet a certain stress requirement, but also can limit the air resistance to a very small value when the air passes through the fine net while fluttering.

The method of suffering different air resistances when the flapping wing flutters up and down: a pure (one-piece) net frame structure is subject to a same and little air resistance when the flapping wing flutters up and down. This almost cannot generate lift force. In order to have strong air resistance when the flapping wing flutters down to generates upward force and have little air resistance when the flapping wing flutters up to avoid the aircraft suffering from air resistance, a series of movable film sheets are arranged under the fine net. One edge of each film sheet is fixed on the fine net. Because the film sheets are very thin and light, the film sheets can swing around the fixed edge when the air blows. When the flapping wing flutters down, the film sheets suffer upward resistance provided by the air and subsequently all of the film sheets are swinging upward; because of the existence of the fine net, the film sheets will closely cover on the fine net at last. At this time, it equals to a big one-piece film sheet covering on the fine net, which suffers a strong air resistance. Moreover, the width of each film sheet is wider than the distance between the film sheets. When the film sheets closely cover on the fine net, there are overlapping parts among them that can perform a better blocking for the air. When the flapping wing flutters up, the film sheets suffer downward resistance provided by the air, and subsequently all the film sheets swing downward around the fixed edge to the position where it suffers minimum air resistance. In this case, it equals to the pure net frame structure that the film sheets have no influence to the air and the air can easily pass through the flapping wing. As a result, the flapping wing suffers a little air resistance. When the flapping wing flutters up and down periodically, in every periodical movement: air resistance is strong when the flapping wing flutters down, and consequently the air provides an upward force to the flapping wing; the air resistance is little when the flapping wing flutters up, and consequently the air has a little influence to provide a downward force. It equals that the air provides upward force to the flapping wing during every periodical movement. Namely, the aircraft generates an upward force to lift. When the fluttering gets more intense, the swing direction of the film sheets might be inconsistent, which might cause opposite swing of some film sheets, and as a result, some places of the fine net is uncovered and air might flow through. This diminishes the air resistance for the flapping wing, and subsequently reduces the lift force of the flying machine (aircraft). Using limit threads or thin stripes to limit the swinging range of the film sheets. Finding several suitable positions on the movable edge of the film sheet, and fixing both ends of the length-limited threads on the suitable positions of the edge of the film sheet and the corresponding fixed positions on the fine net. By doing so, the swinging of the film sheets is limited in a certain range, which can ensure a consistent move direction of all film sheets, and generate lift force in more effective way.

A complete flapping mechanism can be achieved by above description. In such structure, the air can pass smoothly only in the single direction. Namely, the air can pass through the flapping wing smoothly when the flapping wing flutters up; but the air cannot pass through the flapping wing when the flapping wing flutters down. As for other fluid besides air, such as aqueous medium, this structure has similar properties.

This invention has strong practicability and innovation. It is different from existing flapping wing machine (ornithopter) which imitates the wings of birds or insects. The flapping wing designed from the perspective of bionics has a more complicated frame structure because of the intention to imitate the wing action of birds or insects. The design of the net flapping wing frame structure herein is quite simple and can be very light because there is no need to consider about complicated actions. Different from the existing frame covered by a one-piece film sheet, the flapping wing adopts a plurality of movable film sheets to constitute the cover film. Arranging the film sheets in the way described in this invention, the simply fluttering of the frame can lift the flapping machine (ornithopter)

The scope of this invention can be extended to other fluids. In addition to the air fluid, it can also be used in other fluids such as aqueous medium.

1. The arrangement of film sheets is arranged along the radial direction, and can also be arranged along the transverse direction. One edge of each film sheet is fixed on the fine net frame, and the other edge can move freely. When the flapping wing frame beats up and down, the film sheets can open and close automatically and allow air moves through smoothly only in one direction. Therefore, the flapping wing only suffers strong air resistance in a single direction, and consequently lift force is generated.

2. As for dual flapping-wings mechanism, the above mentioned design also can be used. There are four flapping wings in a dual flapping-wings mechanism. When the two top flapping wings flutter down, the film sheets are closed, and consequently the air can hardly pass through the film sheets, and a strong air resistance is provided; when the two bottom flapping wings flutters up, the film sheets are opened, and consequently the air can pass through the film sheets smoothly, and a little air resistance is provided. When the flapping wings flutter in an opposite direction, the two top flapping wings flutters up, the film sheets are opened, it is very easy for the air to pass through, and a little air resistance is generated; when the two bottom flapping wings flutter down, film sheets are closed, it becomes very difficult for the air to pass through, and a strong resistance is generated. Therefore, the flapping wing continuously suffers upward air resistance to generate lift force.

The above mentioned is only a preferable embodiment of the invention, but not to limit the invention. Any changes, equivalent replacement and modification made in the spirit and principles of the present invention shall be included in the protection scope of this invention.

What is claimed is:

1. A flapping wing structure comprising:
   a fuselage;
   a first transmission connected to the fuselage;
   a first flapping wing connected to the first transmission, the first flapping wing comprising, a first support line, a second support line, a first fine net structure located between the first support line and the second support line, and a plurality of first film sheets installed under the first fine net structure; wherein
   the flapping wing structure further comprises a second transmission connected to the fuselage, a second flapping wing, the second flapping wing connected to the second transmission and the second flopping wing comprising, a third support line, a fourth support line, a second fine net structure located between the third support line and the fourth support line, and a plurality of second film sheets installed under the second fine net structure;
   the plurality of first film sheets and the plurality of second film sheets are movable sheets;
   the first support line, the second support line, the third support line and the fourth support line are made of carbon fiber;
   the first fine net structure and the second fine net structure are interwoven structures; and
   the first fine net structure and the second fine net structure are interwoven structures and made of a lightweight filament of carbon fiber or nylon thread;
   one side edge of each film sheet within the plurality of first film sheets is fixed on the first fine net structure; one end of a limit thread is connected with the first fine net structure, the other end of the limit thread is connected with the movable edge of each film sheet the plurality of film sheets are arranged on the same side of the first fine net structure.

2. The flapping wing structure of claim 1, wherein one side edge of each film sheet within the plurality of second film sheets is fixed on the second fine net structure; one end of a limit thread is connected with the second fine net structure, the other end of the limit thread is connected with the movable edge of each film sheet; the plurality of second film sheets are arranged on the same side of the second fine net structure.

3. A flapping wing device comprising:
   a first support line, a second support line, a fine net structure located between the first support line and the second support line, and a plurality of film sheets installed under the fine net structure;
   wherein one side edge of each film sheet within the plurality of film sheets is fixed on the fine net structure; one end of a limit thread is connected with the fine net structure, the other end of the limit thread is connected with the movable edge of each film sheet the plurality of film sheets are arranged on the same side of the fine net structure.

4. The flapping wing device of claim 3, wherein the plurality of film sheets are movable sheets.

5. The flapping wing device of claim 4, wherein the first support line and the second support line are made of carbon fiber.

6. The flapping wing device of claim 5, wherein the fine net structure is interwoven structure.

7. The flapping wing device of claim 6, wherein the fine net structure is an interwoven structure made of a lightweight filament.

8. The flapping wing structure of claim 1 wherein the width of each film sheet in the plurality of first film sheets is wider than the distance between the plurality of first films sheets and the width of each film sheet in the plurality of second film sheets is wider than the distance between the plurality of second films sheets.

9. The flapping wing structure of claim 1 wherein the width of each film sheet in the plurality of first film sheets is wider than the distance between the plurality of first films sheets.

10. The flapping wing structure of claim 1 wherein when the flapping wing flutters up, the film sheets suffer a downward resistance provided by the air or aqueous medium fluid, and subsequently all the film sheets swing downward around the fixed edge to the position where the film sheets suffer a minimum air or aqueous medium fluid resistance.

11. The flapping wing structure of claim 1 wherein the width of each film sheet in the plurality of first film sheets is wider than the distance between the plurality of first films sheets and the width of each film sheet in the plurality of second film sheets is wider than the distance between the plurality of second films sheets.

12. The flapping wing structure of claim 3, wherein the width of each film sheet in the plurality of film sheets is wider than the distance between the plurality of films sheets.

13. The flapping wing structure of claim 3 wherein when the flapping wing flutters up, the film sheets suffer a downward resistance provided by the air or aqueous medium fluid, and subsequently all the film sheets swing downward around the fixed edge to the position where the film sheets suffer a minimum air or aqueous medium fluid resistance.

* * * * *